(12) United States Patent
Harrington

(10) Patent No.: US 7,528,971 B2
(45) Date of Patent: May 5, 2009

(54) METHOD FOR COLOR HALFTONING WHEN UTILIZING REDUNDANT COLOR INKS

(75) Inventor: Steven J. Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 785 days.

(21) Appl. No.: 09/851,210

(22) Filed: May 7, 2001

(65) Prior Publication Data
US 2003/0020931 A1  Jan. 30, 2003

(51) Int. Cl.
*G06F 3/12* (2006.01)
*G06K 15/00* (2006.01)
*H04N 1/40* (2006.01)
*G03F 3/08* (2006.01)

(52) U.S. Cl. .................... 358/1.13; 358/3.23; 358/518; 345/604

(58) Field of Classification Search ................ 358/3.23, 358/518, 520, 523, 1.9, 1.13, 529, 505; 345/604
See application file for complete search history.

(56) References Cited

U.S. PATENT DOCUMENTS

| | | | |
|---|---|---|---|
| 4,275,413 A * | 6/1981 | Sakamoto et al. ........... 358/525 |
| 5,185,661 A * | 2/1993 | Ng .............................. 358/505 |
| 5,390,035 A * | 2/1995 | Kasson et al. ................ 358/518 |
| 5,493,323 A | 2/1996 | Harrington ................... 347/251 |
| 5,553,199 A * | 9/1996 | Spaulding et al. ............. 358/1.9 |
| 5,579,031 A * | 11/1996 | Liang .......................... 345/604 |
| 5,704,026 A * | 12/1997 | Wan ............................ 345/590 |
| 5,982,990 A * | 11/1999 | Gondek ....................... 358/1.9 |
| 6,008,907 A * | 12/1999 | Vigneau et al. .............. 358/1.9 |
| 6,014,226 A | 1/2000 | Harrington et al. ........... 358/1.9 |
| 6,137,596 A * | 10/2000 | Decker et al. ................ 358/1.9 |
| 6,421,142 B1 * | 7/2002 | Lin et al. ..................... 358/1.9 |
| 2001/0028471 A1 * | 10/2001 | Hirokazu .................... 358/1.13 |

* cited by examiner

*Primary Examiner*—James A Thompson
(74) *Attorney, Agent, or Firm*—Christopher D. Wait

(57) ABSTRACT

A method for utilizing redundant color inks to improve image quality while minimizing any undesirable effects such as texture or graininess. The method comprises tessellating the available redundant color space as defined by the available redundant ink colorants into regions where the regions are arranged so as to minimize the range of luminance variation found within the regions. The result is perceived by the eye as less grainy in texture as well as much more pleasing to the eye.

16 Claims, 4 Drawing Sheets

METHOD FOR COLOR HALFTONING WHEN UTILIZING REDUNDANT COLOR INKS

RELATED CASES

Cross reference is herein made to pending U.S. application Ser. No. 09/602,746 to Gaurav Sharma, Zhigang Fan and Shen-ge Wang titled "Color Halftoning Using a Single Successive-Filling Halftone Screen" and incorporated by reference for its teaching.

BACKGROUND OF THE INVENTION AND MATERIAL DISCLOSURE STATEMENT

The present invention relates to a methodology for generating printed color hardcopy. In particular, the present invention is directed to the utilization of redundant color inks with a methodology for identifying which ink combination from a multitude of possible choices is best utilized in rendering a given image.

Using multiple redundant inks is a technique which has been applied to quality black and white prints using inks of various shades of gray. What makes such a technique desirable is that the halftoning scheme that is employed can be made to always select between two adjacent gray levels. In this way, the intensity difference between neighboring pixels in a region of uniform shade is limited to only the small difference of neighboring gray levels. It is this reduction in contrast between pixels that makes the halftone pattern (unwanted texture) difficult to see and thereby improves the image quality. An exemplary approach to this technique can be found in U.S. Pat. No. 6,014,226 to Harrington et al., which is herein incorporated by reference in its entirety for its teaching.

In U.S. Pat. No. 6,014,226 to Harrington et al., a method of multilevel halftoning is described that allows the definition of halftone patterns using more than two gray levels at a time. This feature can be employed to eliminate the texture contours produced when shades formed by a pattern of two levels blends into a shade formed by a single gray level. The method also gives control over the degree to which a given output gray level is used. This can be employed to limit ink coverage when certain levels require more ink to produce than do others. According to the method: initial pixel intensity ranges are obtained; the initial pixel intensity ranges are compared to at least two overlapping threshold arrays; and selection of enhanced pixel intensity levels are determined for halftone cells according to the comparison results of the initial pixel intensity ranges to at least two overlapping threshold arrays wherein the enhanced pixel intensity levels are a function of results from the comparison.

It would be desirable to implement a similar approach to a color system employing additional inks. Unfortunately, unlike a black-to-white gray scale system which is by nature one-dimensional in range, color is itself by nature a three-dimensional system. Therefore, an approach designed for a gray scale system does not generalize well to colors and color space. For example, such a method may be applied to separate individual color components and in so doing the contrast between two magenta values or the contrast between two cyan values is reduced, but there is no control of the contrast between neighboring magenta and cyan values. Thus, such an approach will result in a pixel with dark magenta and dark cyan next to a pixel with light magenta and light cyan. A better and more pleasing solution for the eye would be a dark magenta and light cyan pixel next to a light magenta and dark cyan pixel. This will result in less perceived unwanted texture in the print. This derives from the fundamental response of the eye being more sensitive to luminance information than it is to chrominance information.

Therefore, as discussed above there exists a need for a technique and methodology which will solve the problem of providing a visually acceptable solution to the problem of using multiple or redundant color inks. Thus, it would be desirable to solve this and other deficiencies and disadvantages with an improved methodology.

SUMMARY OF THE INVENTION

The present invention relates to a method for utilizing redundant color inks, comprising tessellating the available color space as defined by the redundant color inks into regions where the regions are arranged so as to minimize the range of luminance variation found within the regions.

More particularly, the present invention relates to a method for utilizing redundant color inks having a given color space, comprising tessellating the color space so as to minimize luminance variation in the redundant color inks utilized.

In particular, the present invention relates to a method for utilizing redundant color inks having a given color space to image data in a printer, comprising tessellating the color space so as to minimize luminance variation in the redundant color inks utilized. This is achieved by sorting the redundant color inks by order of luminance from the darkest to the lightest and connecting the redundant color inks in the sorted order across the color space so as to create triangular non-overlapping tessellated regions.

DESCRIPTION OF THE INVENTION

Figure 1:
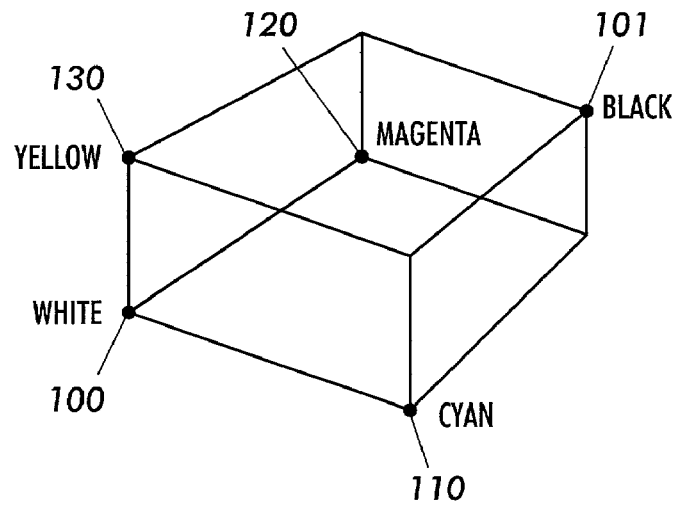
FIG. 1 depicts a three-dimensional rendering of color space.

FIG. 1 provides a simple three-dimensional rendering of color space. This is a simplistic model intended for discussion purposes. At opposing vertices 100 and 101 are found the extremes of white and black respectively. An imaginary line drawn between white vertex 100 and black vertex 101 would represent the linear gamut for luminance. Vertex 110 represents pure cyan; vertex 120 represents pure magenta; and vertex 130 represents pure yellow.

In a typical color system, all the needed colors are rendered using combinations of the above; i.e. yellow, magenta, cyan and black (YMCK). In a redundant color system, there will be some larger set of colorants available. For the purposes of one preferred embodiment, and not to be limited by same, the following Table 1 presents a list of possible colorants and colors formed from the selected combination of two of those colorants for one such embodiment of a redundant color system:

TABLE 1

| | |
|---|---|
| 1 | White |
| 2 | Cyan |
| 3 | Magenta |
| 4 | Yellow |
| 5 | Light cyan |
| 6 | Light magenta |
| 7 | light gray |
| 8 | Dark gray |
| 9 | Black |
| 10 | Light gray-yellow |
| 11 | Light cyan-yellow |
| 12 | Light magenta-yellow |
| 13 | Light cyan-light gray |
| 14 | Light magenta-light gray |
| 15 | Light cyan-light magenta |
| 16 | Light gray-dark gray |
| 17 | Light cyan-dark gray |
| 18 | Light magenta-dark gray |
| 19 | Magenta-yellow |
| 20 | Dark gray-yellow |
| 21 | Light gray-magenta |
| 22 | Cyan-yellow |
| 23 | Light cyan-magenta |
| 24 | Light gray-cyan |
| 25 | Light magenta-cyan |
| 26 | Dark gray-magenta |
| 27 | Dark gray-cyan |
| 28 | Cyan-magenta |

Arbitrary colors in one preferred embodiment will be produced by printing patterns of these 28 basic colors. If we assume linear behavior of the resulting color with respect to the proportions of the basic colors in the printed pattern, then any four of the basic colors defines a tetrahedron in color space that contains the colors that are producible from combinations of the four basic colors. Conversely, to produce a desired color one can identify a tetrahedron that contains the color and has vertices that are in the set of 28 basic colors. One can then produce the color by a combination of four vertex colors.

Figure 2:
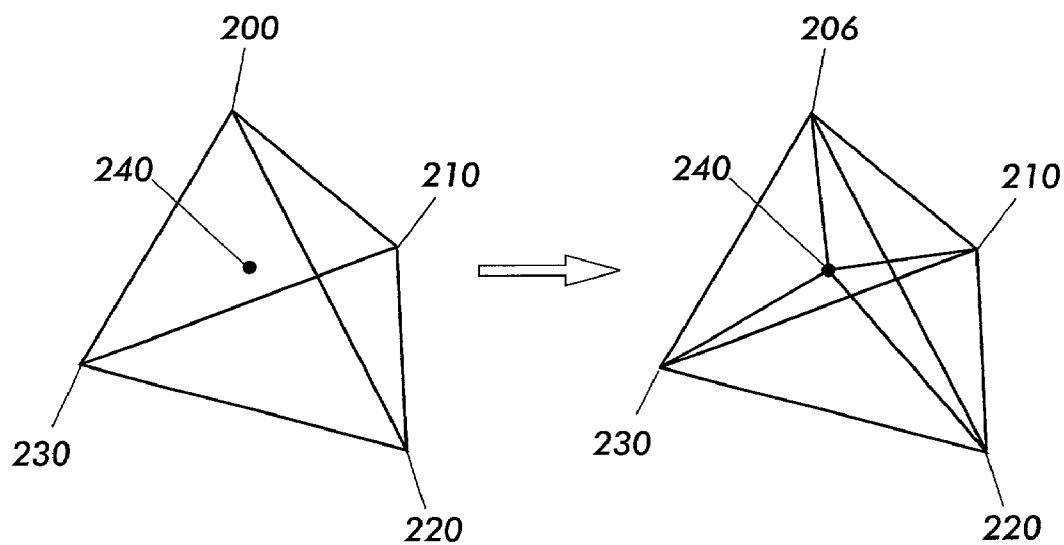
FIG. 2 depicts the tetrahedron results in locating a color point within a given color space.

FIG. 2 is a depiction of this principle that the combination of any four basic colors defines a tetrahedron within which are to be found all possible combinations for that set of colorants. Vertices 200, 210, 220, and 230 represent a selection of four distinct colors. Point 240 is a color that lies within that color space. A straightforward tessellation of the color space allows a determination of the colorant amounts that are then needed to product the color at point 240. For example, the ratio of the volume of the tetrahedron defined by vertices 200, 210, 220 and point 240 to the volume of the tetrahedron defined by 200, 210, 220 and 230 will give the proper ratio amount of the color at vertex 230 to blend to create the color at point 240. This is a technique understood by those skilled in the arts. Explanation in greater detail for this technique may be found in U.S. Pat. No. 4,275,413 to Sakamoto et al. (hereinafter Sakamoto) which is herein incorporated by reference in its entirety for its teaching.

In general, there can be many possible tetrahedra that enclose a given point. The best tetrahedron for a point is the one that has most nearly the same luminance for all of its vertices. This will minimize the luminance contrast in the halftone pattern that produces the desired color. However, it is desirable that the color space be divided into non-overlapping tetrahedra so that there is never any ambiguity about what tetrahedron should be used with any point in color space. So the problem is then to tessellate color space into tetrahedra such that the vertices of the individual tetrahedra have localized luminance values. One could craft a tessellation by hand. However, algorithms for tessellating space into tetrahedra are well known. For example, one can start with a simple tessellation using only a few points that enclose the volume of interest and add points one-by-one. As each point is added, one determines the tetrahedron that contains it and subdivides it into four tetrahedra as depicted in FIG. 2.

Figure 3:
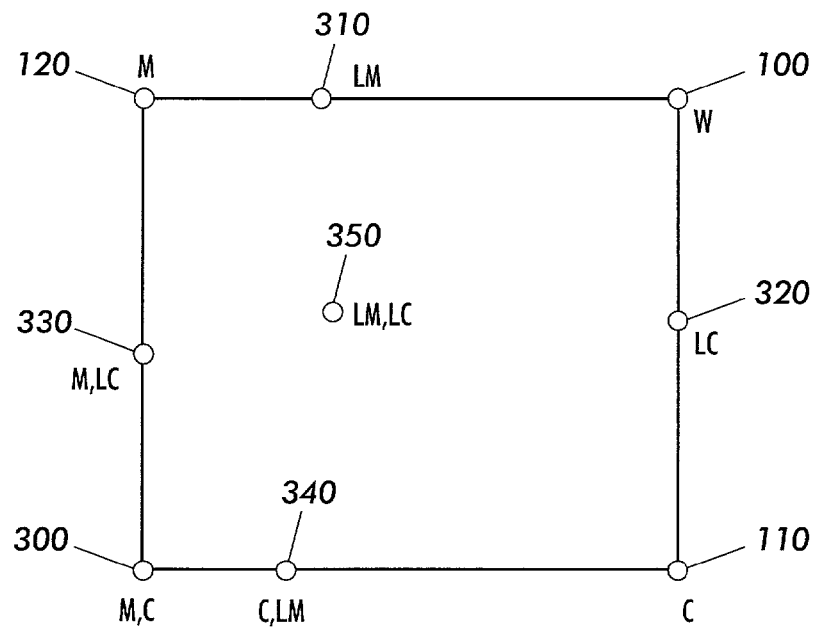
FIG. 3 shows a two-dimensional plane as taken from the color space of FIG. 1, with the addition of redundant colorants.

A discussion of tessellation is easier to understand and communicate when limited to examples of only two dimensions. Extrapolation of concepts developed in such a discussion from a two-dimensional space into a three-dimensional space is then an obvious and simple matter for those skilled in the art. FIG. 3 depicts a two-dimensional slice of the three-dimensional color space depicted in FIG. 1. Vertices for white 100, Cyan 110, and Magenta 120 from FIG. 1 are depicted in FIG. 3, although the orientation has been flipped and rotated as if looking at the rectangle of FIG. 1 from the bottom. The vertex Magenta-Cyan 300 found as entry 28 in Table 1 above is opposite vertex white 100 and as such these vertices represent the available extremes of luminance. Color midpoints representing the additional available redundant color inks are shown in FIG. 3 as well. These are: light magenta 310 (table 1 entry 6); light cyan 320 (table 1 entry 5); magenta-light cyan 330 (entry 23); cyan-light magenta 340 (entry 25); and midpoint light magenta-light cyan 350 (entry 15). Please note that for one preferred embodiment that the redundant inks such as provided here might not be at exact midpoints and also that when mixed together may not even blend in an entirely linear fashion.

Figure 4:
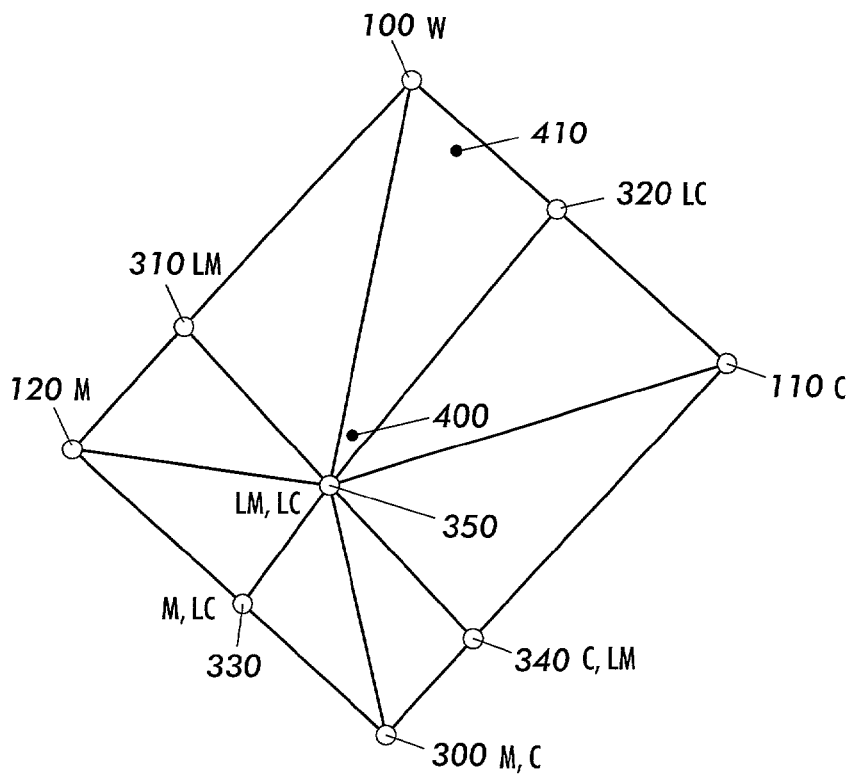
FIG. 4 depicts a first tessellation approach applied to the two-dimensional color plane of FIG. 3.

FIG. 4 depicts a direct and straightforward approach to tessellation of the color space shown in FIG. 3. The color space has been canted slightly to emphasize the depiction of luminance variation by placing the highest points of luminance at the top and the lowest points at the bottom of the depiction. The top of the data at vertex 100 being the lightest and the bottom of the diagram at vertex 300 being the darkest end of available luminance variations. The tessellation employed here consists of breaking-up the color space by defining non-overlapping boundaries running from the center vertex 350 light-magenta light-cyan, and radiating out to all other ink color vertices as shown in FIG. 4. A non-overlapping approach is preferred so as to eliminate ambiguity as to what region a data point lies within. However, this technique as discussed above, undesirably creates tessellation regions which as illustrated here may span more than half the available luminance range. One example is the region defined by the three vertices white 100, light-cyan 320 and light-magenta light-cyan 350. A region arranged as such means that color halftone dots which land in this region will be made up of smaller spots of the above three colorants. These three colorants are far enough apart in luminance to create a grainy texture, and be unpleasant and distracting to the eye. In this example color points 400 and 410 are in this same region as a result of this tessellation approach even though they are quite far apart in luminance.

Figure 5:
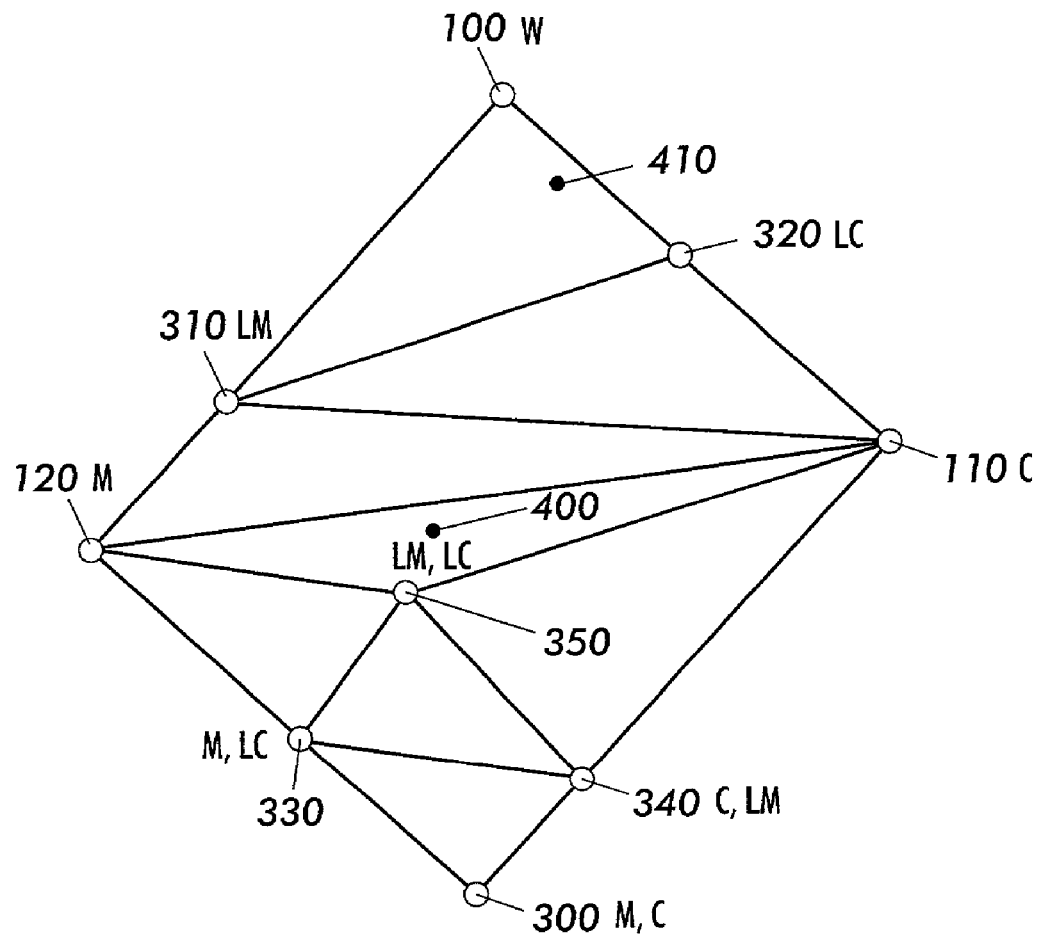
FIG. 5 depicts a preferred second tessellation approach applied to the two-dimensional color plane of FIG. 3.

FIG. 5 shows an exemplary application of the teaching of the present invention to the same color space data as depicted in FIG. 4. This tessellation can be constructed by sorting the color points in order of their luminance and then starting with the darkest point, and adding the points to the set considering each one-by-one. As each point is added, a new triangle is formed from the current three lightest points in the set. If adding the triangle results in a concave shape, then additional triangles must be added to fill the cavity and maintain a convex construction. For a three-dimensional color space this method is generalized to the form tetrahedral volumes from the four lightest points in the set with the addition of each new point. With this exemplary non-overlapping tessellation scheme color points 400 and 410 as shown in FIG. 5 are now not only in separate regions but those regions have two intervening tessellated regions between them. Color point 400 is in the region delineated by colorants cyan 110, magenta 120, and light-magenta light-cyan 350. Color point 410 is in the region delineated by colorants white 100, light-magenta 310, and light-cyan 320. The colorants that are now utilized to create the color dots to represent these color points are much closer in luminance and will therefore combine and blend in a manner much more pleasing to the eye. The redundant ink colorant tessellation as applied here in FIG. 5 has been arranged to minimize the range of luminance variation in the regions. This is achieved by creating region boundaries that are predominately orthogonal to the axis of luminance.

Figure 6:
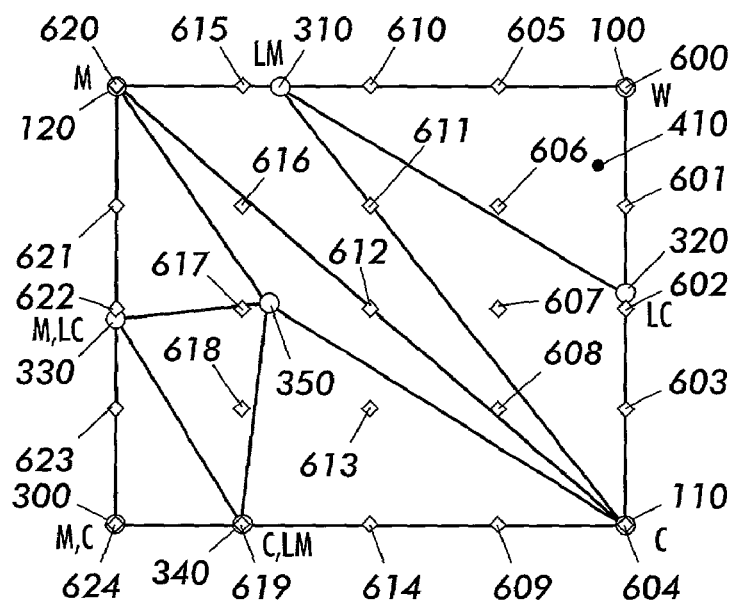
FIG. 6 shows the preferred tessellation of color space of FIG. 5 overlaid with an array of interpolation points.

Applying the teaching described above entails considerable computational power to determine the amount of each colorant for any given color point to be used for each dot in an image. Nor is it economical to pre-compute and store each possible result in memory for lookup. As a practical matter, some combination of pre-calculation and lookup table storage as combined with real time computation is the best tradeoff in cost and speed. In one embodiment of the invention, as shown in FIG. 6, a table of sample data points are overlaid across the tessellated color space first depicted in FIG. 5. The table of data points that are overlaid on the color space are symbolically depicted here in FIG. 6 as the diamonds 600-624. The redundant ink colorants are selected for each data point based upon the prior redundant ink colorant tessellation. Then the relative amounts of each selected ink are computed for each data point. These computed values are then stored in memory to build a table in advance. For instance, take data point 607 for an example. Data point 607 is within tessellation region cyan 110, light-magenta 310, and light-cyan 320; therefore, these would be the selected redundant color inks used. The amounts of those three redundant inks are then computed using the techniques described above with Sakamoto. As a result in the lookup table entry for data point 607 would be stored the three redundant color inks (cyan, light-magenta, and light-cyan) and the computed amounts for each. In the manner described above an entire table of overlaid data points are thereby determined. In this example, a 5 by 5 arrangement is used. As will be evident to one skilled in the art many other arrangements could be used like 8×8 or 16×16 for example. Organizing the color space with a further tessellation on those data points is shown in FIG. 7.

Figure 7:
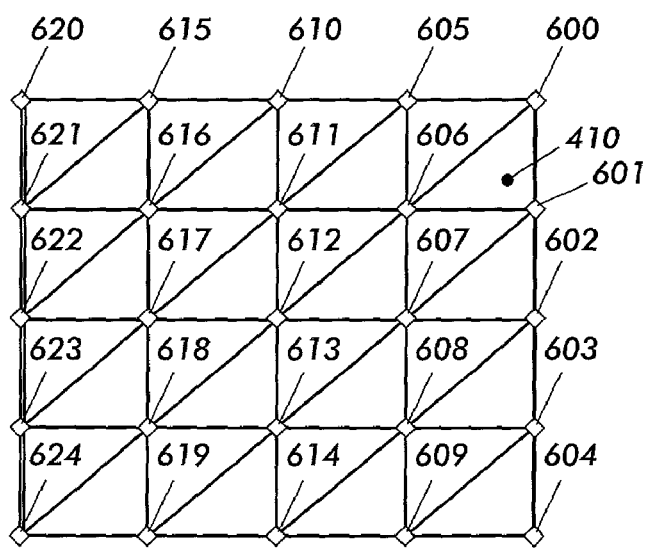
FIG. 7 displays the overlay table of interpolation points on the prior color space with the interpolation tessellation evident.

In FIG. 7 an overlay table is depicted with overlay interpolation points 600 through 624. Also shown is the overlay tessellation triangular regions which when extrapolated into three-dimensional space would be tetrahedra. The techniques of Sakamoto can then be applied. Of course it will be apparent to those skilled in the art that other tessellation arrangements for dividing up the overlay table may be used and that this is simply one possible arrangement dependent upon the amount of memory allotted for the lookup table versus the expense of processing power. Prior example color point 410 is provided as an example in FIG. 7. When color point 410 is the incoming data we can see that by using the overlay lookup table color point 410 lands in the region bounded by interpolation points 600, 601, and 606. Because interpolation points 600, 601 and 606 all lay within the redundant color ink tessellation region 100, 310, and 320 we know that the colorants will be white, light-magenta and light cyan. However, the actual amounts of each colorant must be interpolated from the amounts found listed in the table for interpolation points 600, 601, and 606. The advantage of interpolating from the overlay interpolation points 600, 601, and 606 over interpolating from the colorant points is that the regular overlay grid makes it easy to determine which region contains the desired color point. This means that there is little or no searching or testing of regions to determine which region contains the point of interest, and so the computational time is reduced.

Thus, one way to determine the amounts of colorants to use to produce a given color is to initially divide color space into tetrahedra, and then for each color find which tetrahedron contains it and calculate the necessary proportions as shown below:

The volume of a tetrahedron can be calculated by the absolute value of V where $$V(a,b,c,d) = \frac{1}{6}\begin{vmatrix} x_a & y_a & z_a & 1 \\ x_b & y_b & z_b & 1 \\ x_c & y_c & z_c & 1 \\ x_d & y_d & z_d & 1 \end{vmatrix} = \frac{1}{6}\begin{vmatrix} x_a - x_b & y_a - y_b & z_a - z_c \\ x_a - x_c & y_a - y_c & z_a - z_c \\ x_a - x_d & y_a - y_d & z_a - z_c \end{vmatrix}$$

and $x_i$, $y_i$, $z_i$ are the color space coordinates of color i.

Here, the sign of V depends upon the ordering of the points. This can be used to tell if a point lies inside of a tetrahedron. The point p is inside of tetrahedron (a, b, c, d) if:

sign($V(a, b, c, d)$) =sign($V(p, b, c, d)$)=sign($V(a, p, c, d)$)=sign($V(a, b, p, d)$) =sign($V(a, b, c, p)$)

The volume expression can also be used to determine the amount of each vertex color to use to produce the contained color. The fraction of color a needed in producing color p is given by:

$m_a = V(p, b, c, d)/V(a, b, c, d)$

Similarly, the amounts of colors b, c, and d can be found by:

$m_b = V(a, p, c, d)/V(a, b, c, d)$ $m_c = V(a, b, p, d)/V(a, b, c, d)$ $m_d = V(a, b, c, p)/V(a, b, c, d) = 1 - m_a - m_b - m_c$

This then is similar to the conventional color correction problem where one maps a desired color into amounts of cyan, magenta, yellow and black ink that is typically solved by building a table of such mapping for sampled colors and interpolating between them (See Sakamoto). The difference is that instead of interpolating between just four inks (YMCK), one is now interpolating between the set of basic colors (e.g., the 28 producible colors of Table 1). When interpolating over such a larger color set, most of the values will, of course, be zero, however, which colors are zero and which are active will vary across color space.

Conventional color halftoning assigns different screen angles to each of the colorants to minimize moiré, or uses the same halftone pattern for all colors placing dot on dot. These approaches do not work for the general case of redundant inks. One reason is that when using light inks to reduce contrast, it is desirable that the image be composed of only low contrasting inks, thus, avoiding areas of unmarked paper and those of overprinted ink that are produced by conventional methods. In addition, the present method for one embodiment may make active use of the set of colors generated by overprinting inks. This is contrary to the notion of treating the color separations independently as is currently done.

There is, however, a halftoning method that does generalize to an arbitrary number of inks or colors. This is the method described in U.S. Pat. No. 5,493,323 to Harrington, entitled "Color Images Having Multiple Separations With Minimally Overlapping Halftone Dots", which is herein incorporated in its entirety for its teaching. The method described there uses a single pixel-filling pattern to fill the halftone cell. The method begins by filling in the black pixels of the cell according to the pattern. The next step is to fill with magenta, continuing the pattern where the black left off, and so on for cyan and yellow. The method described the placement of inks (not colors) and so required extra processing to handle the cases where overprinting was required. In these cases, one had to use the pattern a second time to add the second layer of ink. In this invention, however, we shall consider the placement of the base colors (including colors formed by overprinting) rather than the placement of inks. This simplifies the halftoning process since one need only place a single layer of colors and need not bother with additional layers. Some colors will then be interpreted as produced by multiple layers of inks, but this interpretation is done after the halftoning process.

The result of the color interpolation step is a vector or list of base color amounts. This list tells how much of each base color to use to produce the desired color. Many of these quantities will be zero. The sum of the amounts will add up to be one. Actually, the amounts could be scaled by some factor such as 255 to allow the use of integer arithmetic. The halftone pattern is defined by a threshold array T as in the case of conventional halftoning. The array is replicated as needed to cover the page and thus provides a threshold value for each pixel. If $T[x][y]$ is the threshold value at pixel $(x, y)$ and $V[j][x][y]$ is the amount of base color j to use to produce the desired color at this pixel, then the halftoning process for the pixel is summarized by the following C-language fragment:

```
ColoredArea = 0;
for(j = 0; j < NUMBEROFBASECOLORS; j++)
{   ColoredArea + = V[j][x][y];
    if (ColoredArea > T[x][y])
    {   OutputColor(j, x, y);
        break;
    }
}
```

The procedure OutputColor places the combination of inks needed to produce the jth base color at pixel $(x, y)$.

The method steps through the set of base colors accumulating the fraction that each contributes to the halftone cell area. When a color's contribution brings the accumulated total above the threshold for the pixel, then the pixel is given that color and the loop is exited. This way, if the thresholds vary linearly for 0 to 1, the area of the halftone cell is colored in the desired proportions. Further description of the above technique may be found in U.S. application No. 09/602,746 to Sharma et al. titled "Color Halftoning Using a Single Successive-Filling Halftone Screen", which is herein incorporated in its entirety for its teaching.

In summary, practicing the methodology of the present invention comprises tessellating the available color space as defined by the redundant color inks into non-overlapping regions arranged so as to minimize the range of luminance variation found with in those regions. This means creating borders to those regions which are as much as possible predominantly orthogonal to the axis of luminance.

While the embodiment disclosed herein is preferred, it will be appreciated from this teaching that various alternative, modifications, variations or improvements therein may be made by those skilled in the art, which are intended to be encompassed by the following claims:

The invention claimed is:

1. A method for utilizing additional color inks in a printing system, comprising:
    receiving image data as input into a color printing system having YMCK inks and at least one additional color ink;
    tessellating an available color space as defined by the YMCK inks and at least one additional color ink, by using vertices representing each YMCK and the at least one additional ink, to divide the available color space into regions where the regions are arranged so as to minimize the range of luminance variation found within the regions; and,
    applying the resultant tessellated available color space in the selection of the amounts of the YMCK inks and the at least one additional color ink to the rendering of the image data.

2. The method of claim 1 further comprising:
    overlaying the tessellated color space result from the prior tessellating step with interpolation points so as to create an overlay lookup table.

3. The method of claim 2 further comprising:
    applying image data to the overlay lookup table to point to which additional color inks to select and provide the amounts to use of the selected additional color inks.

4. The method of claim 3 wherein the amounts are interpolated from the interpolation points stored in the overlay lookup table.

5. The method of claim 4 wherein the interpolation is performed by calculating the volume of tetrahedra formed by the interpolation points.

6. The method of claim 1 wherein the regions are arranged so that region boundaries are predominately orthogonal to the axis of luminance.

7. The method of claim 1 wherein the regions are non-overlapping.

8. A method in a printing system having YMCK inks, for utilizing additional color inks providing a given resultant color space, comprising:
    receiving image data as input into a redundant color printing system having YMCK inks and additional color inks;
    tessellating into regions the given resultant color space so as to minimize luminance variation in the regions as defined by the YMCK and additional color inks utilized; and,
    applying the resultant tessellated regions in the selection of the amounts of the YMCK inks and additional color inks to the rendering of the image data in the redundant color printing system.

9. The method of claim 8 wherein the tessellation is achieved by:
    sorting the YMCK and additional color inks by order of luminance from the darkest to the lightest,
    adding the YMCK and additional color inks as points to the color space and connecting the points in the sorted order so as to create tetrahedral tessellated regions.

10. The method of claim 9 wherein the regions are non-overlapping.

11. The method of claim 10 further comprising:
    overlaying the tessellated color space with interpolation points so as to create an overlay lookup table.

12. The method of claim 11 further comprising:
    applying image data to the overlay lookup table to point to which redundant color inks to select and provide the amounts to use of the selected redundant color inks.

13. A method for utilizing YMCK and additional color inks having a given resultant color space for rendering image data in a printer, comprising:
    receiving image data as input into a redundant color printing system having YMCK inks and at least one additional color ink;
    tessellating the given resultant color space into regions so as to minimize luminance variation in the regions, the regions delineated by vertices representing each YMCK ink and the at least one additional color ink by:

sorting the delineated vertices as defined by each YMCK ink and the at least one additional color ink by order of luminance from the darkest to the lightest and connecting the delineated vertices as defined by YMCK inks and redundant color inks in the sorted order across the color space so as to create tetrahedral non-overlapping tessellated regions with borders which are as much as possible predominately orthogonal to the axis of luminance; and, applying the resultant tessellated color space regions in the selection of the amounts of the YMCK inks and the at least one additional color ink to the rendering of the image data in the redundant color printing system.

14. The method of claim 13 further comprising:
overlaying the tessellated color space with interpolation points so as to create an overlay lookup table.

15. The method of claim 14 further comprising:
applying image data to the overlay lookup table to point to which YMCK inks and the at least one additional color ink to select and provide the amounts to use of the selected YMCK inks and the at least one additional color ink color inks.

16. The method of claim 13 wherein if creating a tetrahedral non-overlapping tessellated region results in a concave shape then additional tetrahedral non-overlapping tessellated regions are added to fill the cavity and maintain a convex construction.

* * * * *